United States Patent [19]

Morley et al.

[11] 4,346,120

[45] Aug. 24, 1982

[54] FROZEN DESSERT PRODUCT

[75] Inventors: Robert G. Morley, Stone Mountain; W. Ronald Ashton, Duluth, both of Ga.

[73] Assignee: Landwide Foods, Inc., Dover, Mass.

[21] Appl. No.: 210,846

[22] Filed: Nov. 26, 1980

[51] Int. Cl.$^3$ .............................................. A23G 9/02
[52] U.S. Cl. ...................................... 426/565; 426/567
[58] Field of Search ............... 426/565, 566, 567, 658, 426/573

[56] References Cited

U.S. PATENT DOCUMENTS

| | | | |
|---|---|---|---|
| 1,445,200 | 2/1923 | Bullard et al. | 426/565 |
| 1,659,723 | 2/1928 | Cosler | 426/565 |
| 1,781,249 | 11/1930 | Scholl | 426/565 |
| 1,878,203 | 9/1932 | Turnbow | 426/565 |
| 2,139,836 | 12/1938 | London | 426/565 |
| 2,168,934 | 8/1939 | Haskins et al. | 426/565 |
| 2,558,453 | 6/1951 | Minster | 426/565 |
| 2,738,279 | 3/1956 | Stimpson et al. | 426/565 |
| 3,479,187 | 11/1969 | Arbuckle | 426/565 |
| 3,535,122 | 10/1970 | Mussellwhite et al. | 426/565 |
| 3,647,472 | 3/1972 | Speech et al. | 426/565 |
| 3,702,768 | 11/1972 | Tinucane | 426/566 |
| 3,826,829 | 7/1974 | Marulich | 426/565 |
| 3,845,223 | 10/1974 | Moneymaker | 426/566 |
| 3,897,571 | 7/1975 | Homler et al. | 426/327 |
| 3,949,102 | 4/1976 | Hellyer et al. | 426/566 |
| 3,993,793 | 11/1976 | Finney | 426/565 |
| 4,145,454 | 3/1979 | Dea et al. | 426/565 |
| 4,146,652 | 3/1979 | Kahn et al. | 426/564 |
| 4,154,863 | 5/1979 | Kahn et al. | 426/553 |
| 4,178,390 | 12/1979 | Igoe | 426/565 |
| 4,199,604 | 4/1980 | Kahn et al. | 426/327 |
| 4,199,605 | 4/1980 | Kahn et al. | 426/330.6 |
| 4,219,581 | 8/1980 | Dea et al. | 426/567 |

FOREIGN PATENT DOCUMENTS 1508437 4/1978 United Kingdom ................ 426/565

OTHER PUBLICATIONS

"Distinctive Desserts, The New Soft Serve Recipe Book From Taylor Freezer" ©1971 Taylor Freezer Rockton, Ill.
Sommer, Hugo H., PhD., "The Theory and Practice of Ice Cream Making" 6th ed., 1951 Sommer, Mad. Wis.
Arbuckle, W. S., PhD., Ice Cream, 2nd Ed. Avi Publishing Co., Inc., Westport, Conn. (1972).
Glicksman, Martin (Gen. Foods Corp.) "Hydrocolloids" pp. 2-1 through 2-25.
Ross, O. E. (National Pectin Products Co., Chicago, Ill) "Sherbets For Tomorrows Markets" pp. 1-3.

*Primary Examiner*—Jeanette M. Hunter
*Attorney, Agent, or Firm*—Kenway & Jenney

[57] ABSTRACT

A frozen dessert product, which emulates features of conventional soft serve ice cream but at the lower temperatures of home freezers, has a unique composition with multiple stabilizers, multiple emulsifiers, and multiple sugars, and is aerated to a selected specific gravity.

19 Claims, 1 Drawing Figure

FROZEN DESSERT PRODUCT

BACKGROUND OF THE INVENTION

This invention provides a new frozen food product, principally for dessert use, that emulates the features of soft serve ice cream but at such lower temperatures as to be suitable for prolonged storage in store and home freezers. The invention embraces a composition of ingredients and processing steps which provide the new frozen dessert product.

Soft serve ice cream, or simply soft serve, is a highly popular dessert with wide appeal. The soft serve industry has grown to such an extent that it is recognized as a distinct segment of the frozen dessert field and encompasses manufacturers and retailers of soft serve products, and suppliers of processing equipment for the product.

Distinguishing features of conventional soft serve are that it is frozen in a special soft serve freezer, is dispensed by extrusion at carefully chosen sub-freezing temperatures and stands up on a cone or dish upon extrusion. Soft serve generally is consumed almost immediately after extrusion from the soft serve freezer and hence essentially at the extrusion temperature.

Although soft serve of this character has been marketed for many years, it is still available only from stores having special freezers that dispense the product for immediate consumption. This is because the product is dispensed at temperatures between 18° F. and 21° F. (−8° C. to −6° C.). At lower temperatures, the product is no longer soft, but rather is so hard it is unsatisfactory for commercial sale. Conventional soft serve accordingly is not suited for sale from grocery store freezers for home storage and dispensing. Home freezers maintain temperatures generally around 0° F. to 10° F. (−18° C. to −12° C.), and store freezers, which as used herein includes grocery store, supermarket, and restaurant freezers, are generally at colder temperatures.

Others have expended considerable effort to develop a soft serve product for home use, but apparently without success. U.S. Pat. Nos. 4,146,652; 4,154,863; 4,199,605; 4,199,604; 4,145,454; and 3,993,793 and U.K. Patent Specification No. 1,508,437 disclose frozen food products which supposedly are softer than usual at freezer temperatures. However, none is understood to provide a soft serve-like product suitable for purchase from a store freezer for home freezer storage prior to consumption. There is considerable other published art on the subject of frozen desserts, particularly ice cream. A recent text is *Ice Cream, Second Edition* by W. S. Arbuckle, Ph.D., published in 1972 by the Avi Publishing Company, Inc., Westport, Connecticut.

It is accordingly an object of this invention to provide a soft serve dessert product suited for home freezer storage.

It is a further object of the invention that the dessert product be suited for storage in a home freezer and for dispensing, directly from that freezer, by extrusion.

The invention accordingly seeks to provide a frozen food product which emulates features of conventional soft serve but at the significantly lower temperatures standard in home freezers.

It is also an object of the invention to provide a frozen product of the above character which existing commercial ice cream and qualified frozen food distribution companies can store and distribute at the temperatures of available equipment, generally in the order of 0° F. to −10° F. (−18° C. to −23° C.), with high retention of body, texture, volume, and taste for at least six months.

Other objects of the invention will in part be obvious and will in part appear hereinafter.

The invention accordingly comprises a frozen product possessing the features, the properties, and the relation of components which will be exemplified in the dessert product hereinafter described, and the several steps and the relation of such steps with respect to each of the others as exemplified in the process hereinafter set forth. The scope of the invention is indicated in the claims.

BRIEF DESCRIPTION OF DRAWING

For a fuller understanding of the nature and objects of the invention, reference should be made to the following detailed description and the accompanying drawing, which is a graphical representation of yield strength as a function of temperature for the product of the invention and for three prior dessert products.

THE INVENTION

Figure 1:
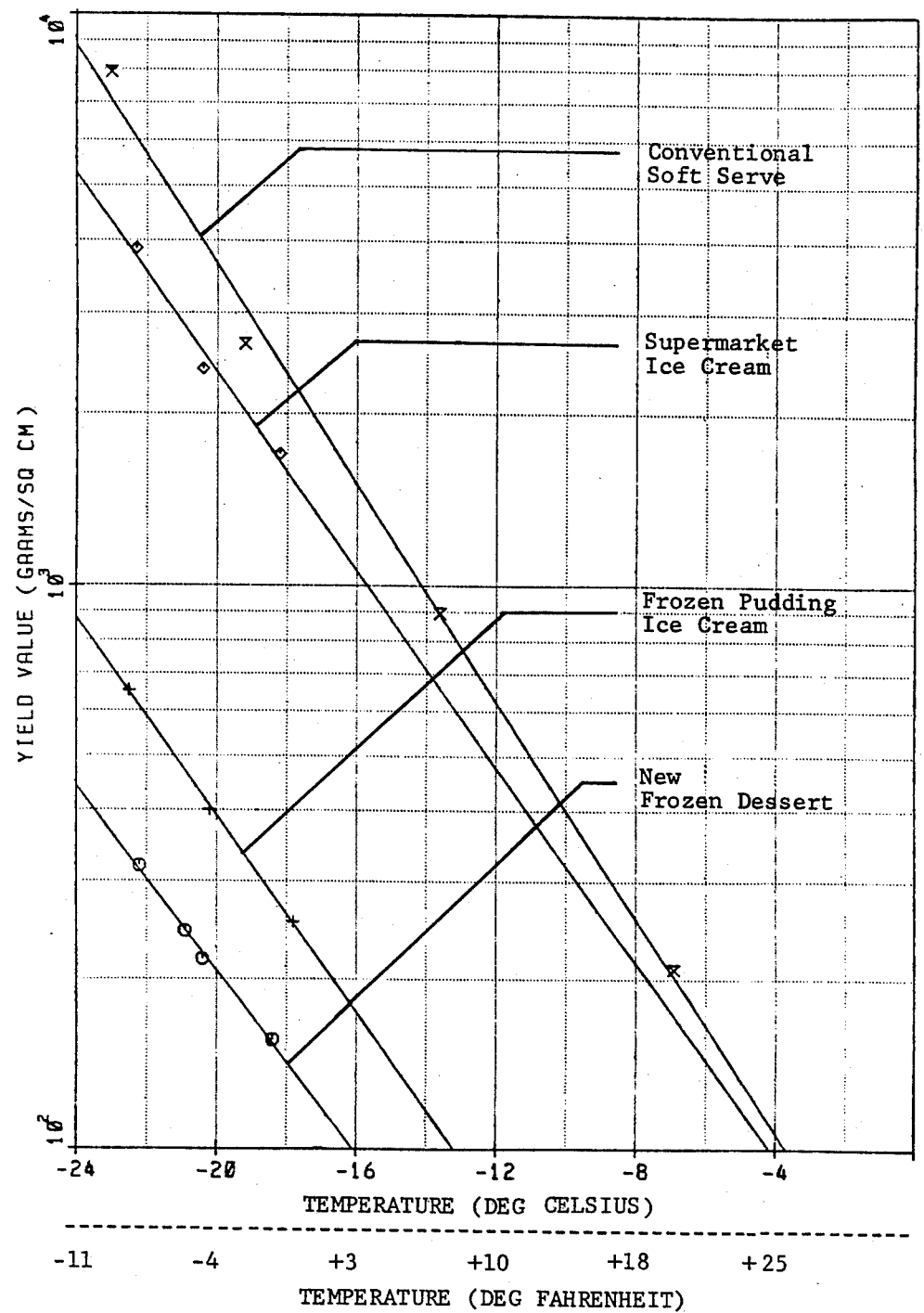

The features of conventional soft serve which are important to consumers include the organoleptic properties of taste, after taste, and mouth feel. Many of these are subjective properties and hence not readily measured or quantified. For example, one important taste which has been difficult to attain in a frozen dessert which is soft enough for extrusion at home freezer temperatures is the absence of a burning sensation. Features of standard soft serve also include the ability to be extruded and to retain the extrudate shape, the ability to stand up in a cone or dish without sagging, sufficient body strength so as not to slip or fall sideways when the cone or dish tips, and the proper bite resistance so that the consumer can either lick the product or bite and chew it with a satisfactory mouth feel. The soft serve is to retain all of these properties, in addition to resistance to melting and dripping, for a sufficient time—generally at least ten minutes—until the serving is eaten.

Other properties of a frozen dessert that is to be sold in a grocery store for home storage and dispensing by extrusion include prolonged storage life without deterioration, whether visible or taste perceptable. The product is also to resist thermal shock, i.e. resist deterioration when subjected to varying temperatures. Temperature variations occur normally in a freezer as the equipment cycles, especially through frost-free operation. An extreme thermal shock occurs when the product is warmed to a near melting temperature and then re-chilled to a freezer temperature, as can occur during transfer of the product from the store freezer to the home freezer.

Stated more technically, a frozen soft serve dessert that can be dispensed by extrusion requires deformation and flow properties, i.e. rheological characteristics, that enable the frozen product, when subjected to the extrusion forces, to become sufficiently fluid to flow through the extrusion nozzle. This performance involves the rheological characteristic termed shear thinning. The extruded product, however, must essentially immediately set-up, i.e. lose the shear-responsive fluidity, in order to retain the extrudate shape and to stand up on a cone or dish. This characteristic of the frozen dessert product may be called coneability. Commercial soft serve is coneable, in that it can be extruded with a rod-like shape and immediately coiled in sequential layers on a cone or dish to provide a spiraled serving that tends to retain its shape.

The attaining of this performance with a product at home freezer temperature requires flow properties different from those of conventional soft serve. They also are different from those of regular ice cream, which cannot be dispensed by extrusion when at home freezer temperatures, but rather requires, as known, scooping or dipping with a tool.

Properties of the frozen material important to attaining the foregoing extrudability and coneability include yield value at the desired extrusion temperature, shear thinning value at the extrusion temperature and shear rate, relaxation time, and lateral resistance.

Yield value is a measure of the material strength as determined from measurements made with a cone penetrometer. A moderate yield value is desired, at the home freezer temperature, in order that the product be extrudable with hand pressure. A material with too high a yield value is unduly hard, and too low a value means the material is unduly soft.

Shear thinning value determines the rate at which a material flows under particular conditions. It is the relative drop in viscosity of the material when subjected to the shear stress and shear rate which cause extrusion at the specified temperature, with the particular orifice configuration used, and at the desired flow rate. The desired value for this invention yields a sufficient flow to dispense a serving of the dessert product within a few seconds.

Relaxation time is the time, typically in seconds, for the dessert product to set up after extrusion at the specified temperature. It is measured as the time required for the yield pressure of the frozen dessert to return to 63.2% of its pre-extrusion value after removal of the pressure which induced the extrusion flow. The relaxation time is to be sufficiently long to allow successive coiled layers of the extruded product to bond together, but short enough so that a cone of the material can be handled, and even tipped, promptly after being dispensed.

Lateral resistance is the elastic strength of the material to resist deformation. The lateral resistance important in the context of this invention can be measured as the force necessary to bend permanently a cylindrical or other rod-shaped extrudate of the frozen product, with given dimensions, at the extrusion temperature. This lateral resistance hence identifies the ability of an extruded conical serving of the product to maintain the extruded shape, e.g., to resist deflection and bending, and for layers of the product to stand up in tiers.

It has been found that a new soft serve dessert product can be formulated and prepared which amply satisfies the foregoing objectives and criteria. The product is prepared ready for consumption and packaged for a consumer to purchase from a store freezer. The consumer stores the product in a home freezer, which as used herein includes the freezer section of a home refrigerator, and dispenses the dessert product directly from the package for consumption. The product preferably is in a package which can be manipulated to extrude the frozen product under hand pressure to yield a serving which is essentially the same in appearance, as well as in taste, as conventional soft serve dispensed from a soft serve freezer.

The frozen dessert product of the invention is formulated with ingredients which provide the fat, protein, water and flavor constituents common in frozen desserts, and further having a new combination of unique multi-ingredient sugar, stabilizer and emulsifier systems. The attainment with these ingredients of the fine taste, the pleasing mouth feel, and the exacting rheological properties required for a household frozen soft serve dessert is deemed unexpected and not predictable.

One particular feature of the new findings is a frozen dessert that has both unusually low specific gravity and substantial body and chewiness. The formulation of the new product enables it to be whipped with significantly more air than is common for ice cream, and thereby to attain the desired low specific gravity. The ice cream and the soft serve industries describe the amount of air in a product as overrun. This term measures the percentage by which the volume of the liquid mix for a product is increased during whipping and freezing. Thus, when one gallon of mix produces two gallons of finished product, the overrun is 100%.

The overrun of the soft serve product of this invention can exceed 200%. This is twice the overrun normally found in regular ice cream. It is understood that regular ice cream mix cannot take 200% overrun and remain appetizing. By contrast, the new product is highly appetizing. In fact, the body, texture and mouth feel of the new product have been judged to be very acceptable and satisfactory.

Another particular feature of these findings is a frozen dessert that is essentially free of "burn". Consumers have identified this perception of a burning sensation on the tongue and in the throat as a serious drawback of products with depressed freezing points. It is believed that the sensation is due to dehydration caused by the additional sugars commonly used as freezing-point depressants. The prior heavy use of sugars also has caused a cloying sweetness.

The new frozen dessert attains significant freezing point depression without a significant burn sensation and without undue sweetness. The invention attains these distinct advantages by combining a unique sugar system with the relatively high overrun. Separate consumer tests have confirmed that the resultant new dessert indeed has the proper sweetness and a pleasing, burn-free after taste.

The ingredients are now described further, beginning with the more common ones. The fat constituent aids in providing a creamy taste and the eating characteristic associated with ice cream-like desserts. It also contributes to the smoothness, the body and the melting resistance of the frozen dessert. The amount of fat in the product is generally within the range of 5% to 15% by weight of the product. The exact amount of fat is not critical, although the amounts of other ingredients generally are to be adjusted as the amount of fat is changed. The fat constituent typically is provided in the form of triglyceride fats and/or oils, and milk fat and/or butter fat are preferred. Hence dairy cream and milk are preferred fat sources. Other edible fats and oils are believed suitable, provided they have a solid fat index within the level desired for taste and performance. Different fats can be used alone or in combination with one another, including the combination of vegetable fats with milk fat. Vegetable oils and fats which are suitable sources of the edible triglycerides include cottonseed oil, soybean oil, corn oil, sunflower oil, palm oil, palm kernel oil, peanut oil, rice oil, safflower oil and coconut oil; and they may be partially or substantially hydrogenated.

The preferred source of the protein constituent of the new dessert product is milk solids not fat (MSNF). Milk solids not fat used in the preferred composition according to the invention aid in providing the desirable properties of whipping ability, smoothness, body, mouth feel, melt resistance, lowering of freezing point, and some sweetness. The MSNF can be derived from cream, milk and non-fat dry milk, or solely from non-fat dry milk with the addition of water. Buttermilk can also be used for a portion of the MSNF. Other protein sources with which the invention can be practiced, generally as substitution for a portion of the MSNF, include milk derived solids such as sweet dairy whey, neutralized acid whey, modified whey, whey protein concentrate, casein, modified casein, sodium caseinate, and calcium caseinate; and further include soy flour, modified soy flour, soy protein concentrate, soy isolate, peanut flour, and peanut protein concentrate. The protein constituent generally accounts for 3% to 5% by weight of the new dessert, with 4% considered preferable. When provided by MSNF ingredients, they account for 5% to 15% of the product weight, with 11% being preferred.

The water constituent of the new dessert which the invention provides generally constitutes from 46% to 60% by weight of the product, including the water present in other ingredients, e.g. milk and cream. Waer preferably constitutes around 53% of the product.

The flavoring constituent of the new soft serve dessert is selected from known flavoring ingredients according to the desired taste, taking into account the other ingredients. This constituent includes, by way of explanation, cocoa, fruits, nuts, and the like as well as other flavorings, both natural and artificial. Note, however, that the ingredient ranges specified herein are for an unflavored product and for a product flavored with a concentrate, e.g. vanilla, present in only a small amount by weight. Those skilled in the art will comprehend the adjustments appropriate for the particular flavoring used.

The sugar constituent of the new soft serve dessert is a combination of saccharides that provides simultaneous control of freezing point depression, sweetness, body and texture, and flavor. The effects in ice creams of added saccharides in contributing to sweetness and in lowering freezing point are known at least in general terms, but the provision of a sugar system that provides a simultaneous blend of organoleptic and material properties required for a household soft serve dessert is considered to be novel. The added sugar to attain these objectives, i.e. in addition to sugars present in the milk solids and other constituents of the product, is in the range of 20–40%, with 24% being preferred. Typically the added sugar plus the sugar in milk solid ingredients constitutes on the order of 30% by weight of the product.

The saccharide system of the invention, which as noted is considered important in providing a frozen dessert having no significant perception of burn, preferably has fructose, sorbitol and corn syrup as at least the major sugar ingredients. The sugar system may, however, employ other saccharides, depending at least in part on the subjective properties desired for the final product. Suitable other sugars are sucrose, dextrose, mannitol and fructose corn syrups. It has, for example, been found that dextrose can replace all or part of the sorbitol, but generally a less desirable flavor results, in particular a burning sensation is experienced upon total replacement. A similar but lesser problem has been experienced by replacing sorbitol with high fructose corn syrup.

It is understood that sugar systems employing a combination of sorbitol and fructose have heretofore been used in certain diabetic ice creams, which of course have significantly different mechanical properties from a soft serve dessert. It further is understood, however, that this prior sugar system did not also employ corn syrup, as found in the practice of the present invention. It also is understood that the new soft serve dessert of this invention employs a signficantly larger added sugar constituent than known diabetic ice cream.

The stabilizer constituent of the invention also contributes to the attainment of the desired performance features of the new household dessert. The stabilizing constituent of the invention typically is in the range between 0.35% to 1.0% by weight of the entire product. The amount varies however with factors including the amount of water and the strength of the stabilizers employed. It is hence considered that features of the invention can be realized with a stabilizer constituent within the broader range of 0.25% to 1.3%. Whatever the amount, the stabilizer system employs at least one stabilizer from each of at least three groups of stabilizers, namely insoluble blocking agents, stabilizing gums, and gelling agents.

The blocking agent is present in an amount generally between 0.1% and 1.0% of the total product. Preferred examples are microcrystalline cellulose and cellulose fibers.

The stabilizing gum is present in a range generally between 0.07% and 0.3% and is selected from locust bean gum, guar gum, propylene glycol alginate, tara gum, sodium carboxymethyl cellulose (CMC), and other cellulose ethers such as methylcellulose, hydroxypropylcellulose and hydroxypropylmethyl cellulose.

The gelling agent is present in an amount generally ranging between 0.1% and 0.5% of the total product and is selected from gelatin, xanthan gum, carrageenan, sodium alginate and pectin.

Where it is desired that the product include a wheying-off (syneresis) protective agent, the gelling agent carrageenan can additionally provide this function.

A stabilizer system considered preferable for practice of the invention consists essentially of microcrystalline cellulose as the ingredient from the first group, a combination of locust bean gun and guar gum from the second group, and gelatin and carrageenan from the third group.

The emulsifier constituent of the invention is in most instances present in the range between 0.2% to 0.8% of the total product and employs ingredients from two emulsifier groups. One emulsifier group is a whipping agent, examples of which are mono- and diglycerides, and distilled monoglycerides. The second category of emulsifier is a drying agent, examples of which are polysorbate 80, polysorbate 65, and ethoxylated mono- and diglycerides.

An emulsifier system found preferable for practice of the invention is a combination of mono- and diglycerides and polysorbate 80.

In addition to the foregoing ingredients, the household soft serve dessert of the invention can include other ingredients, non-limiting examples being lower chain monohydric and polyhydric alcohols, starches, inorganic salts, and pH buffering agents.

The preparation of the soft serve dessert according to the invention employs processing equipment conventional for ice cream, both hard and conventional soft serve, but as set forth below differs from the overall conventional processing. The ingredients first are combined and well mixed, typically by continuous stirring as the ingredients are introduced. The mixed combination is heated as required for pasteurization and to heat treat certain ingredients. In particular, the heating places those stabilizers which are insoluble in cold water into water solution, liquifies fats, and hydrates proteins. The heat treatment preferably employs a relatively low pasteurization temperature, e.g. maintaining the combination at 155° F. for thirty minutes, but can be carried out at higher temperatures for correspondingly shorter times up to on the order of 300° F. for two seconds. The lower temperature heat treatment is considered preferable to attain better taste in the resultant dessert product.

The heated ingredients are homogenized to form an oil-in-water emulsion, typically with the commonly-used two-stage homogenizing equipment. This equipment is preferably operated with an homogenization pressure in the first stage on the order of 2,000 psi and a second stage pressure on the order of 500 psi. These pressures, however, are not considered critical, and other homogenizing pressures can be used.

The homogenized mixture is cooled as required to complete pasteurization. It is considered preferable that the homogenized mixture to be cooled at least to 70° F. quickly after homogenization. The further cooling can occur thereafter. This prompt initial cooling maintains a manageable viscosity in the mixture, so that it can be processed without clogging or plugging the processing equipment. An undesirably thicker product results from slower initial cooling. In one practice, by way of non-limiting example, the initial cooling is effected within a minute of homogenization.

The cooled mixture resulting from the preceding step is subjected to freezing and aeration. The aeration is sufficient to reduce the specific gravity, which otherwise has a value greater than unity, to the unusually low range of between 0.36 and 0.54 and preferably to a value between 0.38 and 0.44. These values of specific gravity of the resultant product correspond to overruns ranging between 110% and 220%, and preferably between 160% and 200%. Beyond the preferred specific gravity, the product is generally considered acceptable, but outside the wider range the product is considered unsatisfactory with regard to desirable eating properties and extrudability.

The freezing and aeration can, for example, be performed with a conventional ice cream freezer which whips the product while dropping its temperature to below freezing. The whipping and freezing operation is continued until the product has attained the desired specific gravity at a temperature below 24° F., preferably in the range of 15° F. to 20° F. The product is removed from the equipment at this temperature and packaged, after which the packaged product is hardened by reducing the temperature to below 0° F. The freezing and whipping operation can include the injection of gas. The gas can, by way of non-limiting example, be air, nitrogen, carbon dioxide, nitrous oxide or a combination of these gaseous fluids. The whipping and freezing step can also be performed by whipping the product to the desired specific gravity within the range stated, typically in the commercially known Oakes brand or Votator brand high-shear whipping equipment, and then blast freezing the whipped product to accomplish the freezing and hardening process in one step. The latter operation can also be carried out with the noted injection of gas under pressure.

The resultant product, with the composition and specific gravity described, possesses the desired physical and organoleptic properties discussed above. It accordingly fully meets the required and desired properties for the new soft serve dessert. The package for the product can be a pressure-tight envelope with an extrusion orifice and which the consumer can squeeze to subject the dessert to pressure which extrudes the product from the nozzle, much in the way that conventional soft serve is extruded from a commercial freezer. But the new dessert of this invention possesses these properties at home freezer temperatures, whereas conventional soft serve is dispensed at significantly higher temperatures.

EXAMPLE 1

One example of the new dessert formulated and processed in the foregoing manner and deemed preferable for practice of the invention is prepared in the foregoing manner with the following ingredients.

11% fat, provided as butter fat
11% MSNF, provided as milk and milk powder
3% fructose, provided as crystalline fructose as marketed for example by the Hoffman-LaRoche Company
10.8% sorbitol
10.0% corn syrup solids, for example Star Dri 35R as marketed by A.E. Staley Co.
0.25% microcrystalline cellulose, for example Avicel RC581 as marketed by FMC Corporation
0.15% gelatin (Bloom strength 225)
0.07% locust bean gum, for example FL 70/50 as marketed by Hercules Company
0.05% guar gum, for example Hercules FG 60/70
0.02% carrageenan, for example Hercules Genulacta L100
0.4% mono- and diglycerides, for example Durem 207 as marketed by the Durkee Company
0.05% polysorbate 80
The balance of the product, by weight, is water.

The product is prepared as described, with an overrun preferred between 160% and 200%.

Consumer testing of the resultant dessert verifies that it is at least comparable, if not superior, to presently available commercial soft serve. The dessert has been lauded as creamy, smooth and free of burn. Moreover, the dessert well satisfies the desired deformation and flow properties at home freezer temperatures as discussed above, as well as withstanding prolonged freezer storage. The product accordingly is indeed readily extrudable, by hand pressure on a collapsible pliable container, immediately upon removal from prolonged storage in a home freezer.

Laboratory tests support the attainment of new and different material properties with the new dessert of this invention. The dessert of Example 1, when prepared with an overrun in the order of 200%, was measured to have a moderately low yield value and a relatively high resistance to lateral deformation. It also exhibited an unusually short relaxation time, which is considered to facilitate extrusion to a cone or dish, even by a first time user of the new dessert. In particular, a measurement comparing the new household dessert of Exhibit 1 at 0° F. with conventional soft serve at 20° F. determined that the relaxation time of the new dessert is on the order of ten times shorter than that of conventional soft serve. In one particular measurement, for example, the new dessert exhibited a relaxation time on the order of two seconds, whereas the conventional product, at the higher temperature at which it operates, exhibited a relaxation time on the order of twenty-five seconds. These tests included conventional ice cream at the store freezer temperature of 0° F., but that product was not extrudable under reasonable pressures and hence no corresponding measurement was obtained of relaxation time.

A series of standard laboratory cone penetrometer measurements was performed on the foregoing dessert of Example 1, conventional soft serve, and two different ice creams, one a standard supermarket brand and the other a frozen pudding which contains alcohol. The dessert product of this invention exhibited the lowest yield strength. The measured penetration distances were converted to yield values according to the standard formula $$Y = KL/Z^{1.6}$$

where Y is the yield value in grams/square centimeter, L is the applied cone load in grams, Z is the measured penetration in 1/10 millimeter units, and K is a constant for the particular cone angle.

The accompanying drawing is a semi-log plot of the yield values obtained in this manner for each of the four samples as a function of temperatures at which measurements were made. It is noteworthy that the product of this invention, as desired, exhibits a yield value, at the home-freezer temperature range at which it is to be extruded, of the same order of magnitude as the yield value of conventional soft serve at the higher, i.e. 18° F. to 21° F., temperatures at which it is extruded.

A further test determined that the new dessert of Example 1 has flow and deflection properties distinctly different from those of conventional soft serve, as well as from conventional supermarket ice cream. The test was conducted with the new dessert and with the ice cream at household freezer temperatures, i.e. 0° F., and with the conventional soft serve at the standard extrusion temperature of 20° F. The supermarket ice cream fractures, rather than bending, when subjected to gravity or other loading force. Conventional soft serve exhibits progressive plastic bending under these conditions. It hence deforms progressively until the load is equalized or removed. The new dessert of Exhibit 1, on the other hand, exhibits a distinctly elastic deformation, but of relatively small magnitude. Further, the tests indicate that the new dessert of this invention is plastic while under the shear loading for extrusion, but reverts quickly to elastic behavior. Conventional soft serve, on the other hand, appears to be plastic under all conditions when at the 18° F. to 21° F. temperature at which it is extruded.

It will thus be seen that the objects set forth above, including those made apparent from the preceding description, are efficiently attained. Since certain changes may be made in the composition and the product set forth, and in carrying out the foregoing process without departing from the scope of the invention, it is intended that all matter contained in the above description and shown in the accompanying drawing be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A frozen dessert product
   A. characterized at least in part by being extrudable and coneable at near 0° F. for serving by extrusion at home freezer temperatures,
   B. consisting essentially, by weight in the absence of significant weight by flavorings, of
      (1) edible triglycerides in a range from 5% to 15%,
      (2) protein in a range from 3% to 5%,
      (3) water in a range of 46% to 60%,
      (4) saccharides in a range from 20% to 40%, and including plural saccharides selected from the group consisting of sorbitol, fructose, dextrose, corn syrup, mannitol and sucrose,
      (5) stabilizers in a range from 0.25% to 1.3% and including at least a first stabilizer selected from the group consisting of guar gum, locust bean gum, tara gum, propylene glycol alginate, sodium carboxymethyl cellulose, and other cellulose ethers; a second stabilizer selected from the group consisting of microcrystalline cellulose and cellulose fibers; and a third stabilizer selected from the group consisting of gelatin, xanthan gum, carrageenan, pectin and sodium alginate, and
      (6) emulsifiers in a range from 0.2% to 0.8% and including at least a first emulsifier selected from the group consisting of mono- and diglycerides and distilled monoglycerides, and a second emulsifier selected from the group consisting of polysorbate 65, polysorbate 80, and ethoxylated monoglycerides, and
   C. having a specific gravity in the range of between 0.36 and 0.54.

2. A frozen dessert product according to claim 1 further characterized in that said sacchrides include at least three sacchrides selected from the group consisting of sorbitol, fructose, dextrose, corn syrup, mannitol and sucrose.

3. A frozen dessert product according to claim 1 further characterized in that said sacchrides consist essentially of sorbitol, fructose and corn syrup.

4. A frozen dessert product according to claim 1 further characterized in that said stabilizers consist essentially of microcrystalline cellulose, locust bean gum, guar gum, gelatin and carrageenan.

5. A frozen dessert product according to claim 1 further characterized in that said emulsifiers consist essentially of mono- and diglycerides and polysorbate 80.

6. A frozen dessert product according to claim 1 further characterized in that
   A. said edible triglycerides are provided at least in major part by butter fat,
   B. said protein is provided at least in major part by non-fat milk solids,
   C. said stabilizers consist essentially of microcrystalline cellulose, locust bean gum, guar gum, gelatin and carrageenan, and
   D. said emulsifiers consist essentially of mono and diglycerides and polysorbate 80.

7. A frozen dessert product according to claims 1 or 6 further characterized in that said specific gravity is in the range between 0.38 and 0.44.

8. A frozen dessert product according to claim 6 further characterized in that said saccharides consist essentially of sorbitol, fructose, and corn syrup.

9. A frozen dessert product according to claim 8 further characterized in that said stabilizers are present in a range between 0.35% and 1.0%.

10. A frozen dessert product extrudable and coneable at near 0° F. for serving by extrusion at home freezer temperatures,
   A. said product comprising, by weight in the absence of significant weight of flavorings, edible triglycerides in a range from 5% to 15% and provided at least in major part by butter fat, protein in a range from 3% to 5% and provided at least in substantial part by non-fat milk solids, and water, and
   B. said product further consisting essentially of
      (1) a saccharide system in a range of 20% to 40% and including fructose, sorbitol and corn syrup,
      (2) a stabilizer system in a range from 0.35% to 1.0% and consisting essentially of microcrystalline cellulose, locust bean gum, guar gum, gelatin and carrageenan, and
      (3) an emulsifier system in a range from 0.2% and 0.8% and consisting essentially of mono- and diglycerides and polysorbate 80, and
      (4) having a specific gravity in a range between 0.36 and 0.54.

11. A frozen dessert product extrudable and coneable at near 0° F. for serving by extrusion at home freezer temperatures and comprising, by weight in the absence of significant weight of flavorings, 11% edible triglycerides provided at least in part by butter fat, 11% milk solids not fat provided at least in part as milk and milk powder, 3% fructose, 11% sorbitol, 10% corn syrup solids, 0.25% microcrystalline cellulose, 0.15% gelatin of bloom strength 225, 0.07% locust bean gum, 0.05% guar gum, 0.02% carrageenan, 0.4% mono- and diglycerides, 0.05% polysorbate 80, and the balance essentially of water, said product being prepared with of overrun between 110% and 220%.

12. A frozen dessert product according to claim 11 further characterized in that said overrun is between 160% and 200%.

13. A frozen dessert product
   A. extrudable and coneable at temperatures near 0° F. for serving by extrusion at home freezer temperatures,
   B. including ingredients providing a fat constituent and a protein constituent and flavoring and water,
   C. further consisting essentially of
      (1) a sugar constituent including plural saccharides selected from the group consisting of sorbitol, fructose, dextrose, corn syrup, mannitol and sucrose,
      (2) a stabilizer constituent including at least a first stabilizer selected from the group consisting of guar gum, locust bean gum, tara gum, propylene glycol alginate, and sodium carboxymethyl cellulose and other cellulose ethers, a second stabilizer selected from the group consisting of microcrystalline cellulose and cellulose fibers, and a third stabilizer selected from the group consisting of gelatin, xanthan gum, carrageenan, pectin and sodium alginate, and
      (3) an emulsifier constituent including at least a first emulsifier selected from the group consisting of mono- and diglycerides and distilled monoglycerides, and a second emulsifier selected from the group consisting of polysorbate 65, polysorbate 80, and ethoxylated monoglycerides, and
   D. having a specific gravity in the range between 0.36 and 0.54.

14. A dessert product according to claim 13 further characterized in that
   A. said sugar constituent consists essentially of sorbitol, fructose, and corn syrup,
   B. said stabilizer constituent consists essentially of microcrystalline cellulose, locust bean gum, guar gum, gelatin and carrageenan,
   C. said emulsifier constituent consists essentially of mono- and diglycerides and polysorbate 80,
   D. said specific gravity is in the range between 0.38 and 0.44.

15. A process for preparing a frozen dessert product that is extrudable and coneable at temperatures near 0° F. for serving by extrusion at home freezer temperatures, and in which ingredients are mixed, heated, homogenized, cooled and frozen with aeration, said process being further characterized by the steps of
   A. constituting the product, by weight in the absence of significant weight by flavorings, of edible triglycerides in a range from 5% to 15%, protein in a range from 3% to 5%, water in a range from 46% to 60%, saccharides in a range from 20% to 40%, stabilizers in a range from 0.25% to 1.3% and including at least a first stabilizer selected from the group consisting of guar gum, locust bean gum, tara gum, propylene glycol alginate, and sodium carboxymethyl cellulose and other cellulose ethers, a second stabilizer selected from the group consisting of microcrystalline cellulose and cellulose fibers, and a third stabilizer selected from the group consisting of gelatin, xanthan gum, carrageenan, pectin and sodium alginate, and emulsifiers in a range from 0.2% to 0.8% and including at least a first emulsifier selected from the group consisting of mono- and diglycerides and distilled monoglycerides, and a second emulsifier selected from the group consisting of polysorbate 65, polysorbate 80, and ethoxylated monoglycerides, and
   B. providing the product by said aerating step with a specific gravity in the range of between 0.36 and 0.54.

16. A process according to claim 15 further characterized in that said heating step employs only a low-temperature pasteurization heating.

17. A process as defined in any of claims 15 or 16 further characterized in that said cooling step reduces the temperature of the homogenized product mix to below 70° F. sufficiently promptly after homogenization to maintain a manageable viscosity.

18. A process as defined in claim 15, 17 having the further improvement in which said aeration is selected to provide the product with a specific gravity between 0.38 and 0.44.

19. A process for preparing a frozen dessert product that is extrudable and coneable at temperatures near 0° F. for serving by extrusion at home freezer temperatures, that includes ingredients providing a fat constituent and a protein constituent and flavoring and water, and in which the ingredients are successively mixed, heated, homogenized and frozen, said process being further characterized by the steps of
   A. further constituting the dessert product to consist essentially of (1) a sugar constituent including plural saccharides selected from the group consisting of sorbitol, fructose, dextrose, corn syrup, mannitol and sucrose,
(2) a stabilizer constituent including at least a first stabilizer selected from the group consisting of guar gum, locust bean gum, tara gum, propylene glycol alginate, and sodium carboxymethyl cellulose and other cellulose ethers, a second stabilizer selected from the group consisting of microcrystalline cellulose and cellulose fibers, and a third stabilizer selected from the group consisting of gelatin, xanthan gum, carrageenan, pectin and sodium alginate, and
(3) an emulsifier constituent including at least a first emulsifier selected from the group consisting of mono- and diglycerides and distilled monoglycerides, and a second emulsifier selected from the group consisting of polysorbate 65, polysorbate 80, and ethoxylated monoglycerides, and B. aerating the homogenized ingredient mix to provide the product with a specific gravity in the range between 0.36 and 0.54.

* * * * *

UNITED STATES PATENT AND TRADEMARK OFFICE
CERTIFICATE OF CORRECTION

PATENT NO. : 4,346,120
DATED : August 24, 1982
INVENTOR(S) : Robert G. Morley, W. Ronald Ashton It is certified that error appears in the above-identified patent and that said Letters Patent are hereby corrected as shown below:

Column 5, line 26, change "Waer" to --Water--.

Column 11, line 39, change "of" (2nd. occurr.) to -- an --.

Column 12, line 50, (claim 17) change "claims" to --claim--.

Column 12, line 50, (claim 17) delete "or 16".

Column 12, line 55, (claim 18) change "claim" to --claims--.

Column 12, line 55 (claim 18) between "15" and "17" insert --16--.

Signed and Sealed this

Third Day of May 1983

[SEAL]

Attest:

Attesting Officer

GERALD J. MOSSINGHOFF
Commissioner of Patents and Trademarks